United States Patent
Criscito et al.

[19]

[11] Patent Number: 5,854,945
[45] Date of Patent: Dec. 29, 1998

[54] BAR CODE SCANNER WITH KEYBOARD SIMULATION

[75] Inventors: Herbert V. Criscito, Denville; Xin Zheng, Northvale; Brian Zhang, Riveredge, all of N.J.

[73] Assignee: Opticon, Inc., Orangeburg, N.Y.

[21] Appl. No.: 781,345

[22] Filed: Jan. 21, 1997

[51] Int. Cl.$^6$ .................................................. G06F 13/00
[52] U.S. Cl. ...................... 395/882; 395/856; 395/892; 235/435
[58] Field of Search ............................ 235/435; 705/407; 395/825–827, 832, 840, 856, 882, 892

[56] References Cited

U.S. PATENT DOCUMENTS

| | | | |
|---|---|---|---|
| 4,642,761 | 2/1987 | Yanagiuchi et al. | 395/856 |
| 5,034,598 | 7/1991 | Poland | 235/435 |
| 5,530,893 | 6/1996 | Sugi | 395/825 |
| 5,615,120 | 3/1997 | Schwartz et al. | 705/407 |

*Primary Examiner*—Christopher B. Shin
*Attorney, Agent, or Firm*—Henry I. Schanzer

[57] ABSTRACT

A bar code scanner having means for reading bar code data and for processing the data includes means for supplying the processed data to a computer having an input/output (I/O) port designed for the connection thereto of an external keyboard. The scanner includes "communication" means for enabling the scanner either to be "wedged" between an external keyboard and the I/O port or to be directly connected to the I/O port. The scanner's "communication" means includes means for sensing whether an external keyboard is connected to the computer and includes means responsive to sensing the absence of an external keyboard connection for producing signals similar to those produced by an external keyboard and for supplying these signals to the computer in order to establish and maintain communication between the scanner and the computer. The bar code scanner may also include means for responding to various computer commands and/or keyboard commands.

16 Claims, 6 Drawing Sheets

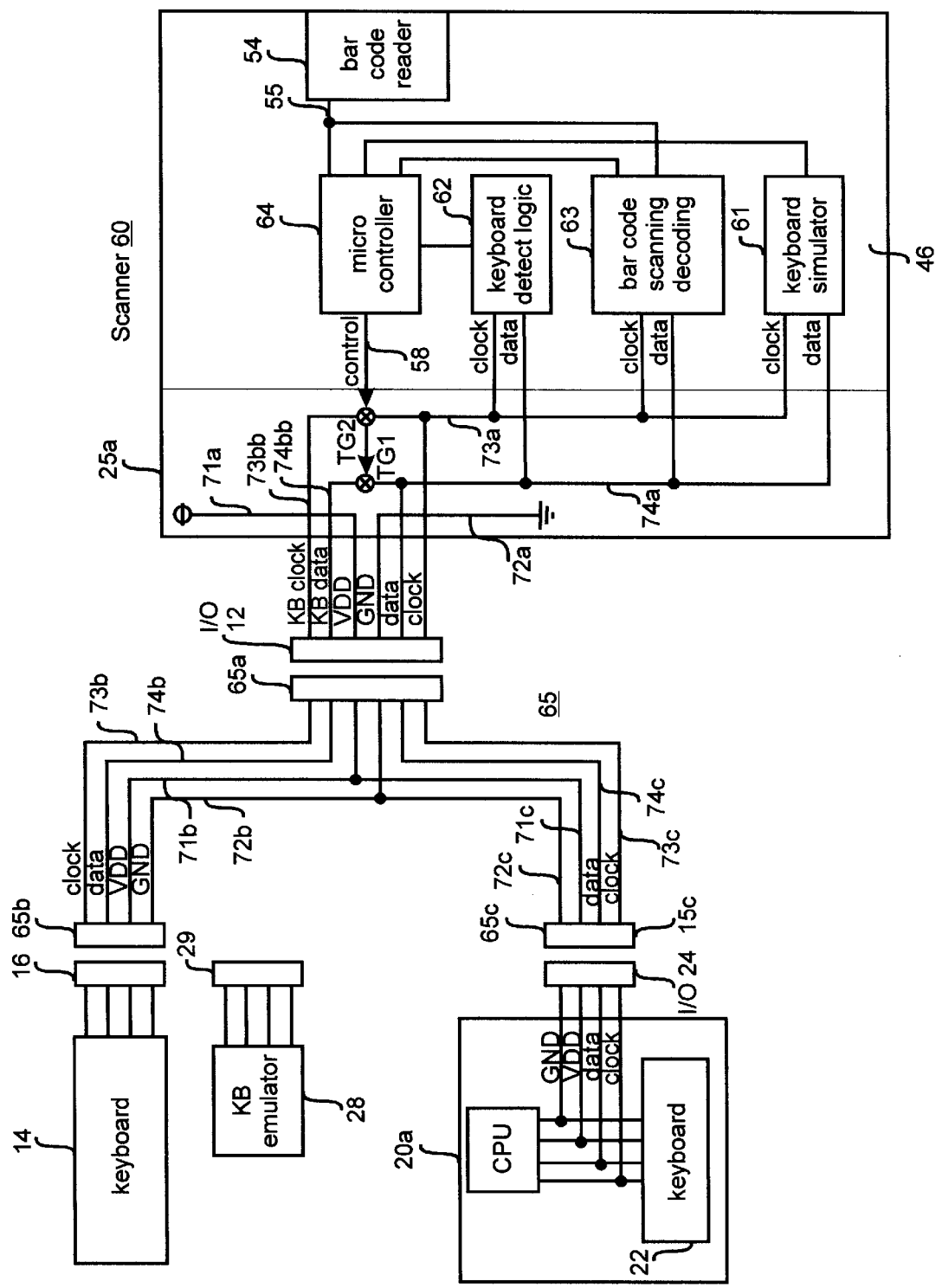

BAR CODE SCANNER WITH KEYBOARD SIMULATION

BACKGROUND OF THE INVENTION

This invention relates to bar code scanners and, in particular, to a bar code scanner which includes means for simulating the response of an external keyboard and for rendering the bar code scanner suitable for use with any type of personal computer (PC) including, for example, a desktop or laptop computer.

A bar code scanner is a scanning device which can read, or sense, bar code information and which includes means for converting bar code information into digital information, such as ASCII code, known as "decoded data".

In many applications it is desirable to transfer data read and decoded by a bar code scanner to a personal computer (PC). However, the transfer of decoded data from a bar code scanner to a PC may be problematic. This is so, because a personal computer (PC) does not normally have an input/output (I/O) port designed for the connection thereto of a bar code scanner.

Normally, as shown in FIG. 1, a computer (e.g., CPU 20) has an external I/O port 24 for the connection thereto of an external keyboard (e.g., KB 14). A common technique for transferring decoded data from a bar code scanner to a computer, of the type shown in FIG. 1, is to "wedge" a scanner 10 between an external keyboard 14 and a CPU 20 as shown in FIG. 2. In FIG. 2, the bar code scanner 10 has an interface circuit 25 connected or "wedged" between CPU 20 and external keyboard 14. The keyboard 14 is shown having an I/O port 16 and the scanner 10 is shown having an I/O port 12. A "Y" cable 15 couples the I/O port 24 of CPU 20 and the I/O port 16 of external keyboard 14 to I/O port 12 of scanner 10. The Y cable functions to: (a) couple the power lines from CPU 20 to the power lines of the scanner 10 and keyboard 14; (b) couple the data and clock lines of CPU 20 to the data and clock lines of scanner 10; and (c) couple the data and clock lines of CPU 20 and scanner 10 via transmission gates TG1 and TG2 of interface circuit 25 to the respective data and clock lines of keyboard 14. The turn-on and turn-off of transmission gates TG1 and TG2 is controlled by means of circuitry contained within a scanner microcontroller 101.

In FIG. 2, cable 15 couples CPU 20 via interface circuit 25 to scanner 10 and external KB 14. The scanner 10 and/or the interface circuit 25, when coupled via cable 15 to a CPU and a KB, may be referred to as a "wedge" since it is connected or "wedged" between a keyboard (e.g., KB 14) and a CPU (e.g., 20).

A "wedge" interface is very desirable because users can easily install a "Y" cable having one end (15c) of the Y cable connected to I/O port 24 with the remaining two ends (15a, 15b) of the Y cable being respectively connected to an I/O port 12 of a scanner 10 and an I/O port 16 of a KB 14.

The bar code scanner 10 controls the communication path between the CPU 20 and the KB 14 by controlling the turn-on and turn-off of TG1 and TG2 [also referred to herein as the "traffic control switch" (TCS)] in interface circuit 25. When the scanner 10 is powered or when it has no decoded data to send to the CPU, the scanner enables (closes) transmission gates TG1 and TG2, so the CPU 20 and the KB 14 can communicate directly. When the scanner has decoded data in its data buffer that it is ready to send to the CPU, it disables or turns off (opens) TG1 and TG2 and transmits its decoded data to the CPU 20. When TG1 and TG2 are disabled, communication between the KB and the CPU is cut-off. Upon completing the transmission of the decoded data, the scanner 10 turns on (enables) TG1 and TG2.

Communication between a computer 20 and an external KB 14 may be conducted directly via 4 lines connected between the computer's I/O port 24 and an I/O port (e.g., 16) of an external KB 14 as shown in FIG. 1; where the 4 lines are used for carrying the operating voltages, the clock and the data. Alternatively, communication between a computer and an external KB may be conducted via a wedge, as shown in FIG. 2.

The CPU and the KB can communicate bi-directionally over the clock and data lines. The source of each of these lines is an open-collector (or drain) device (not shown) in each one of the KB and the CPU which allows either the KB or the CPU to force a line to an inactive (low) level. When there is no communication between the CPU and the KB, both clock and data lines are at an active (high) level. When the CPU sends data to the KB, it forces the DATA line to an inactive (low) level and allows the clock line to go to an active high level. The clock line provides the clocking signals used to clock serial data into and out of the CPU. The KB generates the clock signal for the data transfered between the CPU and the KB. The CPU can prevent the KB from sending data by forcing the clock line to an inactive (low) level.

In the prior art system of FIG. 2, communication between the CPU and the scanner is one way communication. That is, the CPU supplies commands/data to the scanner 10, the scanner 10 does not respond to commands from the CPU, it only supplies decoded data to the CPU. When the scanner supplies data to a CPU, just prior to the transmission of decoded data to the CPU, the scanner 10 checks the clock line to determine that it is in an active (high) state (i.e., indicative that the CPU is ready to receive data) at the beginning of a scan code transmission. Once the scanner begins to transmit data it does not again check the status of the line, even when CPU stops receiving data. This may result in the loss of data since the scanner continues to transmit data to the CPU, but the CPU does not accept or process this data.

In the prior art system, if the CPU indicates that there is an error (e.g., parity error) in the data it has received and requests the scanner to "resend" the data, the scanner does not recognize the command and does not check and resend to correct a "receiving" error sensed by the CPU.

In the prior art configuration, bi-directional communication between the computer 20 and the external KB 14 is taken care of by the external KB. The existence of the KB 14 is essential to have the computer 20 keep the I/O port 24 active; which I/O port is effectively designed for interfacing with the external KB.

However, as is well known, there are computers which have built-in internal keyboards. This is the case for most laptop computers and PC based point of sale (POS) systems. As shown, for example, in FIG. 3, in a computer 20a with a built-in keyboards 22 the interconnections between internal keyboard 22 and the processing circuitry of the CPU are "hard wired". As a result, there is not a physical wire connection between the CPU of computer 20a and internal KB 22 which can be easily detached. As a result, a bar code scanner can not be easily "Wedged" in between an internal KB 22 and the CPU of computer 20. Nevertheless, a computer 20a with an internal KB 22 usually has an external I/O port 24a to enable users to use an alternative external KB 14 as shown in FIG. 3. In FIG. 3, the external I/O port 24a is shown to be coupled to the CPU and the internal KB via a control gate (or network) 23. The CPU may disable control gate 23 (via line 231) if the CPU senses that an external KB is not connected to I/O port 24a.

Where CPU 20a has an external I/O port 24a, a "Y" cable 15 may be used to "wedge" a bar code scanner 10 between I/O port 24a and an external KB 14, as shown in FIG. 4. However, as noted above, I/O port 24a may be disabled (deactivated) when the CPU senses that an external KB is not connected to I/O port 24a. If, and when, that occurs, a scanner, although connected to I/O port 24a, could not communicate directly with the computer. In the absence of an external KB, a KB emulator could be connected via cable 15 to the computer and the scanner, as shown in FIG. 5. However this requires the use of an additional piece of equipment (i.e., external KB emulator 28) which is undesirable because of the additional cost and the need to use a piece of otherwise unnecessary equipment.

Therefore, it is an object of this invention to enable a bar code scanner to communicate directly with any computer (i.e., one having an internal and/or an external keyboard) regardless of the presence or absence of an external keyboard.

It is a further object of this invention to enable a bar code scanner to be "wedged" between any computer and an external keyboard connection and to communicate bi-directionally with the computer in essentially the same manner as an external keyboard connected in circuit with the computer.

It is a still further object of this invention to resolve various problems of the prior art systems described above.

SUMMARY OF THE INVENTION

A bar code scanner embodying the invention includes means for coupling the scanner to a computer unit (CPU), means for sensing whether an external KB (or a keyboard emulator) is connected to the CPU and means for producing signals simulating the presence of an external keyboard. If the bar code scanner senses that an external keyboard is not present, the bar code scanner produces signals simulating the presence of an external keyboard and supplies those signals to a computer unit to establish and maintain bi-directional communication between the CPU and the scanner.

In one embodiment of the invention, a bar code scanner includes an interface circuit for "wedging" the scanner between an external keyboard and a CPU for controlling the transmission of data and clock signals between the external keyboard and the CPU. The bar code scanner includes means for sensing whether an external keyboard is connected to the CPU, means for producing signals simulating the signals produced by an external keyboard, and means for supplying these "simulated" signals to the CPU when an external keyboard is not connected to the CPU.

In another embodiment of the invention, the scanner includes means for simulating the signals produced by an external keyboard, means for coupling the scanner to an external I/O port of a computer, and means for sensing whether an external keyboard is connected to the computer. If the scanner senses the presence of an external KB, the scanner turns off or disables its KB simulator function. If the scanner does not sense the presence of an external KB, the scanner turns on, or enables, its KB simulator function.

In still another embodiment of the invention, the bar code scanner includes means for sensing the setting or status of certain external KB commands such as "Caps Lock", and means for transmitting to the CPU decoded bar code data consistent with a "Caps Lock" keyboard setting.

In still another embodiment of the invention, the scanner is programmed to receive CPU commands and to check the data and clock lines to conduct bi-directional communication with the CPU, continuously. The scanner can therefore respond to CPU commands while the scanner is sending decoded data to the CPU. A scanner embodying the invention may also include means for sensing the timing and the length of the start up period of any KB connected to the computer and for adjusting the timing of the scanner, whereby users don't need to set up the KB to certain status conditions before a scanning operation.

A bar code scanner embodying the invention may be directly plugged into a computer's external I/O port, even where the I/O port is primarily designed for the connection thereto of an external keyboard. The scanner makes the CPU believe that there is an external KB connected to its I/O port so the computer keeps its I/O port active. The computer's I/O port can then receive input data from the scanner as it does from an external KB. A bar code scanner embodying the invention can thus be "substituted" for an external KB or it can be "wedged" between an external KB (or a KB emulator) to the I/O port of a computer.

Connecting a scanner embodying the invention to an I/O port of a computer increases the decoded data transmission reliability since the scanner responds to commands from the CPU while transmitting decoded data to the CPU.

BRIEF DESCRIPTION OF THE DRAWING

In the accompanying Figures like reference characters denote like components.

FIG. 6 is a block diagram of a scanner system embodying the invention.

DETAILED DESCRIPTION OF THE INVENTION

Figure 1:
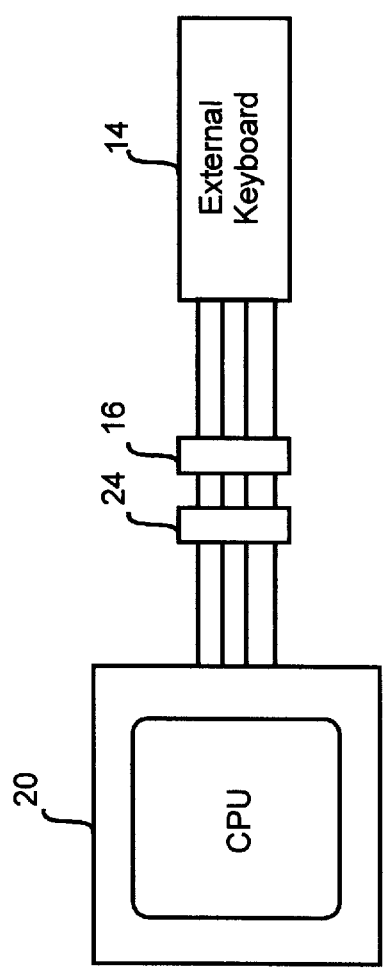
FIG. 1 is a simplified block diagram of a prior art system in which an external keyboard is connected to a computer.

FIG. 6 depicts a bar code scanner 60 and an external keyboard 14 (or a keyboard emulator 28) which can be coupled to a computer 20a via a "Y" cable 65. The bar code scanner 60 is effectively coupled or "wedged" between the CPU 20a and the KB 14 via cable 65. The computer 20a, has an internal keyboard 22 and an I/O port 24. However, computer 20a may be any suitable computer or central processor known in the art, with or without an internal keyboard. In FIG. 6, as in the prior art, computer 20a has 4 lines coming into I/O port 24; two lines for carrying the clock signals and the data signals and two lines for carrying the operating voltages (VDD and Ground). The line (or lines) for carrying the positive operating voltage (e.g., VDD assumed to be +5 volts) among the CPU, the KB and the scanner is denoted with the prefix 71. The line(s) for carrying the negative operating voltage (e.g., ground) among the CPU, KB and scanner is denoted with the prefix 72. The clock (or CLK) line(s) for carrying the clock signals is denoted with the prefix 73. The data (or DATA) line(s) for carrying the data is denoted with the prefix 74.

The keyboard 14, which may be any suitable external keyboard known in the art, has an I/O port 16 for connecting to the keyboard's clock, data and operating power lines.

The scanner 60 has an I/O port 12 to which six (6) internal lines from the scanner are connected; of the six lines, four lines (71a, 72a, 73a, 74a) are for interconnecting the scanner with the CPU 20a and two lines (73bb, 74bb) are for interconnecting the scanner with the external keyboard 14.

Figure 2:
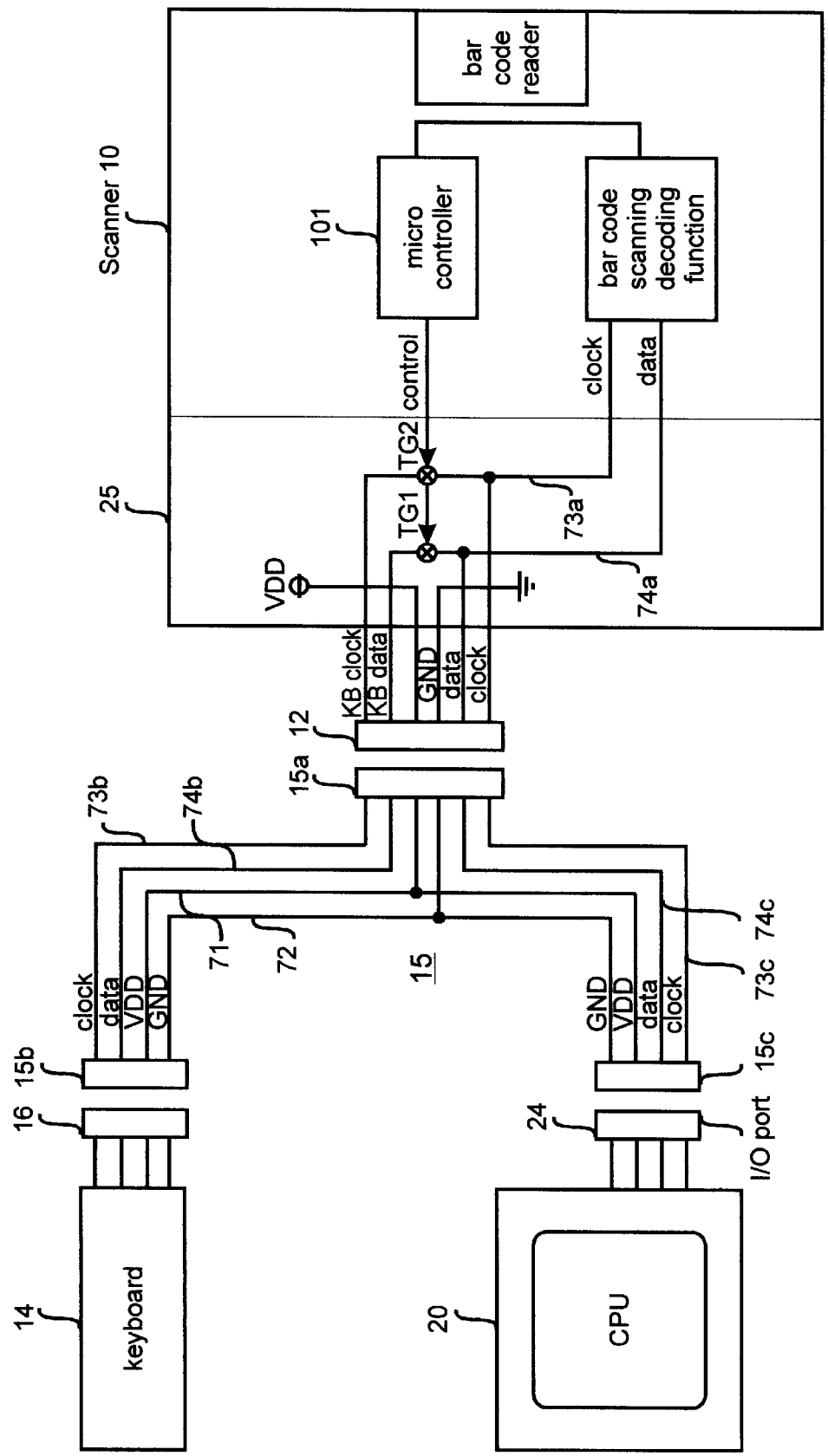
FIG. 2 is a block diagram of prior art system in which a bar code scanner is "wedged" between an external keyboard and a computer.
Figure 3:
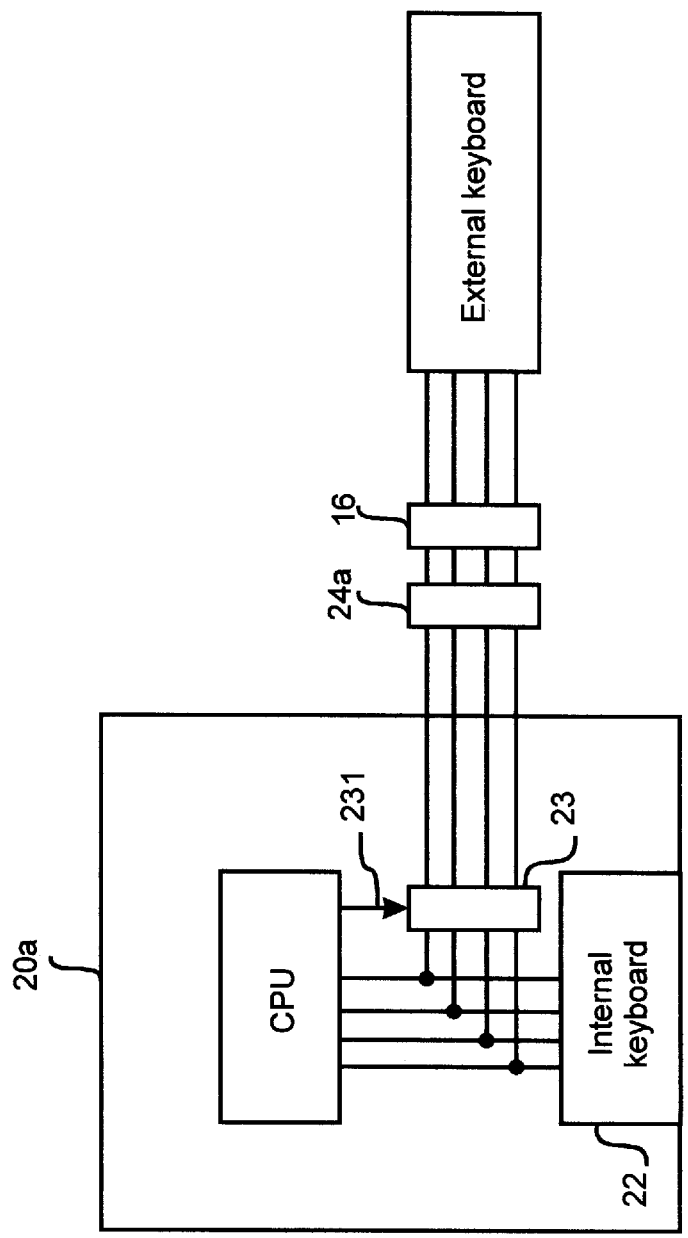
FIG. 3 is a simplified block diagram of a prior art system in which a computer with an internal keyboard (KB) has an external I/O port for the connection thereto of an external KB.
Figure 4:
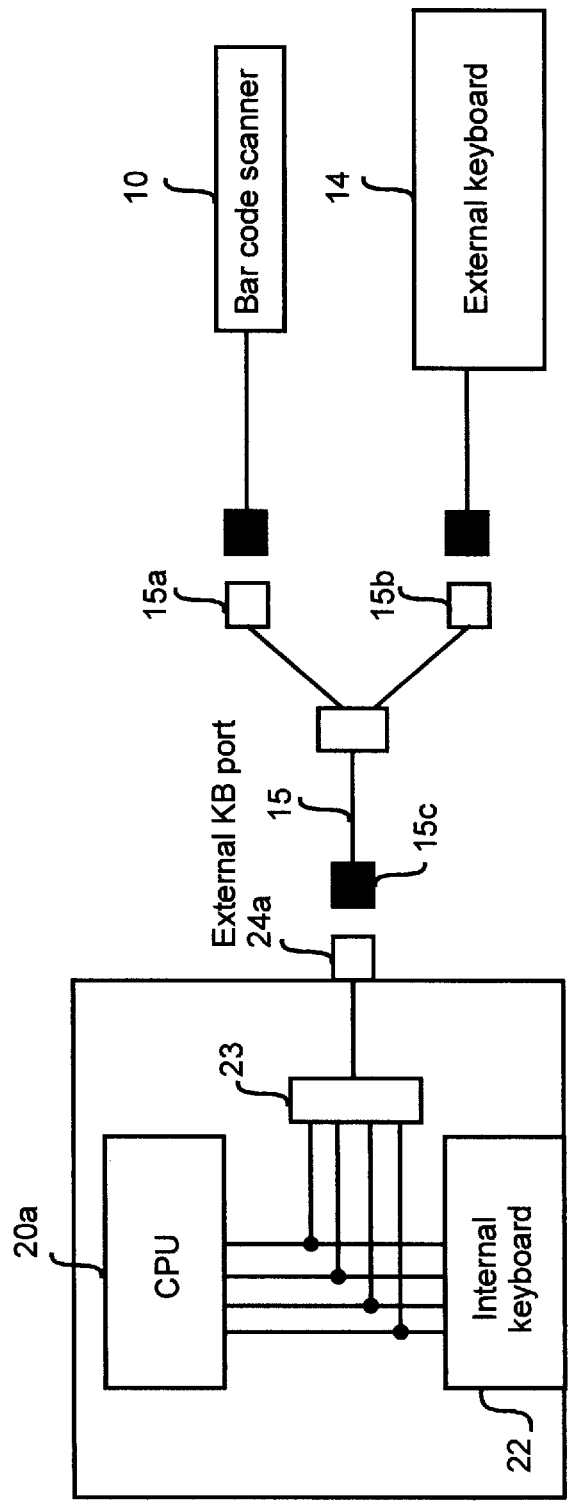
FIG. 4 is a simplified block diagram of a prior art system in which a computer with an internal KB is coupled via a "Y" cable to an external KB and a bar code scanner.
Figure 5:
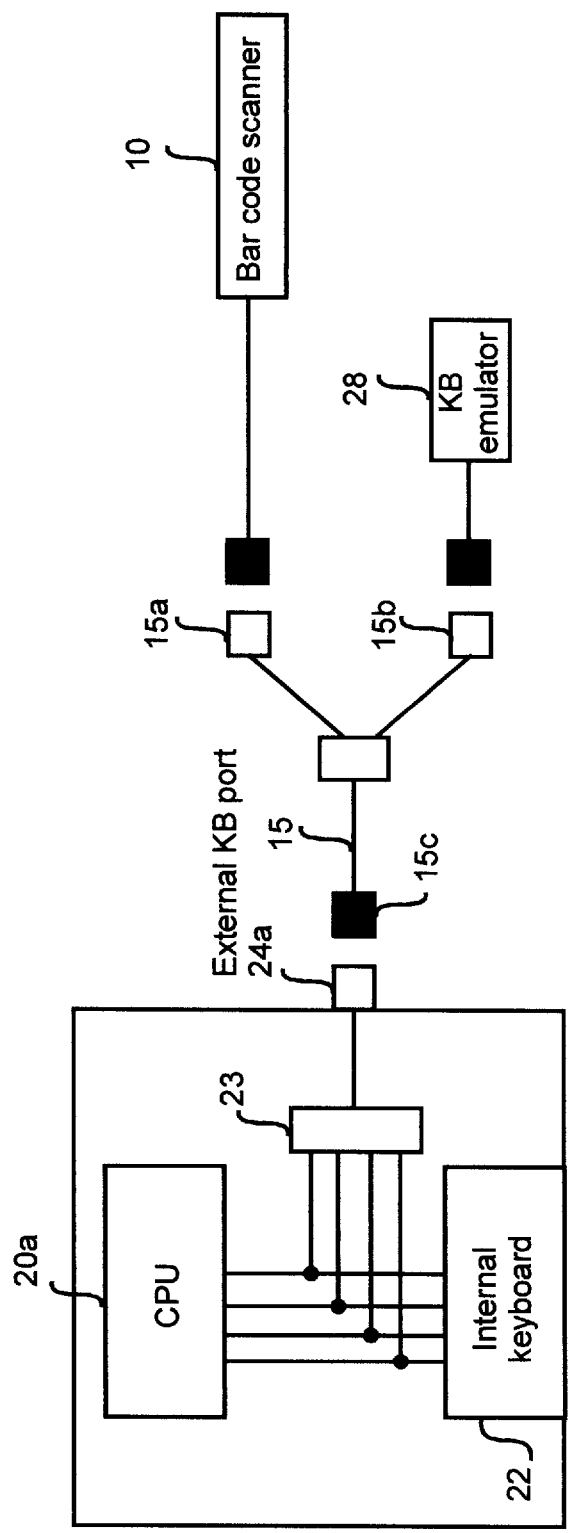
FIG. 5 is a simplified block diagram of a prior art system in which a computer with an internal KB is coupled via a "Y" cable to a KB emulator and a bar code scanner.

The scanner is interconnected with the CPU and the KB 14 via a "Y" shaped cable 65 having one end, connector 65a, connected to scanner I/O port 12, having another end, connector 65b, connected to KB I/O port 16 and having a third end, connector 65c, connected to CPU I/O port 24. Cable 65 may be (but need not be) similar to prior art cable 15 shown in FIG. 2. Cable 65 functions to interconnect power line 71c (the VDD line) from computer 20a to power line 71b of KB 14 and power line 71a of scanner 60. Likewise, cable 65 functions to interconnect power line 72c (ground line) from computer 20a to power line 72b of KB 14 and power line 72a of the scanner. The clock line from computer 20a is coupled from I/O port 24a via connector 65c and clock line 73c to connector 65a and via I/O port 12 to clock line 73a of the scanner. In a similar manner, data from the computer is outputted via I/O port 24 onto DATA line 74c which is coupled via connector 65a and I/O port 12 to DATA line 74a of the scanner. Cable 65 also functions to interconnect the clock and data lines (73b and 74b, respectively) of KB 14 to the clock and data lines (73bb and 74bb, respectively) of the scanner and CPU 20a.

The barcode scanner 60 shown in FIG. 6 includes a main scanner section 46 and an interface section 25a. Section 46 is shown to include a KB simulator section 61, a KB detect logic section 62, a bar code scanning decoder section 63, a microcontroller section 64, and a bar code reader section 54 to read or sense a bar code located externally to the reader. The bar code reader 54 may be any of a multiplicity of bar code readers which are known in the art. The data read or sensed by the bar code reader is supplied (e.g., via a line 55) to bar code scanning decoder 63 and to microcontroller 64 for further processing and/or transmission. The decoding and processing of the bar code data is similar to that performed in known systems whose teachings are incorporated herein, and need not be detailed.

The interface circuit 25a includes two control gates, TG1 and TG2, which are turned on and off by means of controller 64 via control signals on a control line 58. Control gates TG1 and TG2 may be transmission gates TG1 and TG2, which function to control the connection of the clock and data lines of KB 14 to the clock and data lines of the CPU 20 and the scanner 60. Interface circuit 25a may be (but need not be) similar to interface circuit 25 shown in FIG. 2.

In contrast to the prior art, the KB simulator function 61 and the KB detect logic function 62 of the bar code scanner 60 enable communication to take place bi-directionally between the CPU 20 and the scanner 60 whether or not a KB (or KB emulator) is connected in circuit with the CPU. That is, connector 65a of cable 65 may be connected to I/O port 12 of the bar code scanner 60 and connector 65c may be connected to I/O port 24a, with connector 65b being either connected to or disconnected from I/O port 16 of a KB. Alternatively, the bar code scanner connector 12 may be directly plugged into I/O port 24 of CPU 20a and the CPU will interface and interact with scanner 60 as if the scanner were a keyboard. Thus, in systems embodying the invention, connector 65b may be selectively connected to I/O port 16 (or I/O port 29 of emulator 28), or it may be left disconnected (open).

The two controllable transmission gates TG1 and TG2 in section 25a are for selectively coupling clock line 73c/73a to the keyboard clock line 73b, and for selectively coupling data line 74c/74a to keyboard data line 74b. The scanner 60 controls the turn-on and turn-off of transmission gates TG1 and TG2 via control line 58. The turn-on and turn-off of TG1 and TG2 in turn controls communication between the CPU 20a and the external KB 14 (or the external KB emulator 28).

When the transmission gates TG1 and TG2 are turned-off (open), lines 73c/73a and 74c/74a are decoupled from lines 73b and 74b, respectively. However, line 73c is always connected to line 73a and line 74c is always connected to line 74a, whereby the sensing and decoding circuitry of the scanner 60 is always connected to sense the status of the computer and/or the presence of an external keyboard.

When the transmission gates TG1 and TG2 are turned-on (closed), lines 73c and 74c are coupled to lines 73b and 74b, respectively, and the KB 14 (or KB emulator 28) can communicate with the CPU 20a.

In systems embodying the invention the scanner is programmed to respond to all commands from the CPU in exactly the same way as the KB normally responds to the CPU commands. Based on the nature of the command or data signal received from the CPU, the scanner will respond as programmed.

The scanner is programmed to sense whether an external KB or a KB emulator is present as detailed below. Sensing can be achieved using hardware or using software. In the circuit of FIG. 6, the keyboard detector logic 62 is programmed to automatically detect the presence of an external KB (or a KB emulator) as part of "the KB Power-On Routine". When power is first applied to the CPU, power is distributed from the CPU to the KB and the KB begins with a self-checking procedure. Upon the completion of the selfchecking procedure, the KB sends a completion code (Hex AA) to the CPU. Note that when the scanner is "wedged" between the KB and the CPU, direct communication between the KB and the CPU is initially enabled because when the scanner is powered up (with the CPU and the KB connected in circuit), the scanner turns on the "traffic control switch"; i.e., gates TG1 and TG2 are initially turned-on to provide a connection between the CPU and the KB. Thus, upon application of power to the system (i.e., the CPU, KB and scanner), the KB goes through a self-checking sequence during a start up period. At the end of the start up period, the KB produces a set and/or sequence of "completion code" signals and supplies the signals over the data and clock lines to the CPU and the scanner. If a KB is not present (i.e., not connected to the CPU) this set of KB signals is not produced. Scanners embodying the invention include means for sensing the set or sequence of "completion code" signals generated by a keyboard.

If the KB detect logic 62 of scanner 60 senses the set of signals indicating that a KB is present it sets a register or a random access memory (RAM) located in microcontroller 64 (or in another control section of the scanner) to a first condition ("KB present") to indicate the presence of a KB. In response to the "KB present" condition the scanner microcontroller 64 is programmed and inhibited from clocking commands and/or data out of the CPU except during "decoded data transmission period". When a "KB present" condition exists, the keyboard is responsible for clocking data from the CPU.

If the scanner does not sense the presence of the set of signals, it sets the register to a second condition ("KB absent") indicative of the absence of a KB. When the scanner is set to the "KB absent" condition, the transmission gates TG1 and TG2 are turned-off and the scanner clocks the data on the data line between the CPU and the scanner. That is, when the scanner is set to the "KB absent" condition, the scanner clocks out data from CPU (i.e., the scanner supplies clock signals to clock out data from the CPU). Thus, if the "KB absent" condition is set, the scanner clocks the data on the data line, and, if the "KB present" condition is set, the scanner does not clock the data on the data line. Note that each time power is applied to the CPU and to a scanner connected to the CPU, the scanner checks for the presence of an external KB (or KB emulator) during a "start up" period, which is a predetermined period of time after power is applied to the CPU. After being powered up, a CPU distributes power to the devices connected to its I/O port 24. The CPU then waits for a fixed period to receive a signal from the external KB that it is powered-on. If a power on signal typically generated by an external KB, is not detected during this fixed period time, the CPU normally sends a "reset" command to the KB. In the absence of a scanner embodying the invention, if the KB fails to clock the command data from the CPU, the CPU would conclude that there is no evidence connected to its I/O port so that it would set the clock "low" and would subsequently ignore any input from the KB port. At this point, the KB port is technically dead.

The scanner also has a waiting time period referred to herein as a "KB detecting period" which is a period of time during which the scanner waits for a power-on signal from the KB, which power-on signal is normally sent out by a KB after it is powered-up. If the power-on signal is not detected during this "KB detecting period", the scanner of FIG. 6 sends out a simulated KB power-on signal to tell the CPU that there is a KB-like-device (i.e., the scanner) attached to I/O port 24 and the scanner also turns off the TCS. The "KB detecting period" time is normally pre-set at the factory (i.e., during manufacture) when the "KB detecting period" time is longer than the CPU's cut off time, the scanner is programmed to recognize this situation by detecting that the clock line is low for too long a period time. The scanner is programmed to then automatically adjust the internal software switches to reduce the "KB detecting period" and to save the switch settings into an electronically erasable programmable read only memory (EEPROM) in the microcontroller section. When the next time the scanner is powered-up, the new setting of "KB detecting" which is controlled by the software switches saved in the EEPROM function to define the "KB detecting" time period. After the start-up period, the CPU and/or the scanner no longer check for the presence/absence of a KB until the next time power is applied.

A feature of the scanner embodying the invention is that it is programmed to automatically adjust the length of time of the "start-up" period to fit the different timing periods associated with different keyboards (or KB emulator). This is set up each time a scanner is plugged into the system or unplugged from the system.

Where a KB is not present, a CPU and the scanner connected to the CPU communicate bi-directionally with each other.

In response to a CPU generated request-to-send (RTS) signal, after the scanner 60 detects an RTS command from the CPU, the scanner 60 interrupts its current scanning and decoding operation and generates a clock signal to clock out command or data from the CPU into the scanner.

When the scanner 60 has scanned data and the data is ready to be sent to the CPU, the scanner is programmed to sense that the CPU 20 is ready to receive the data by checking whether the CLK line is active (high).

The scanner 60 may be directly connected to I/O 24 of the CPU 20a. CPU 20a may have an internal keyboard 22 as shown in FIG. 6 and may be a "Laptop" computer. In the laptop mode (or whenever the scanner is directly connected to a computer's I/O port) the scanner acts the same as a keyboard. The scanner will receive commands from PC system at any time after power on. Also, it will respond to commands which it receives from the PC and set or reset corresponding software switches to configure the scanner. Like any keyboard, the scanner can be automatically switched between different types of PC's.

Unlike prior art wedge scanner configuration, there is not another keyboard device attached to the scanner. The scanner in accordance with the invention may be automatically set to detect the presence of a KB. If a keyboard is found, the scanner will be configured as a wedge scanner. Otherwise, the scanner is configured as a Laptop scanner.

The scanner of the invention is fully keyboard compatible. In addition to wedge keyboard program, additional scan code table is added to match with keyboard. Like keyboard, the new scanner is capable of receiving and responding to PC system command. According to the PC command, scanner can be initialized and set or reset specific switches. By communicating with PC terminal, the new scanner becomes a part of PC system which is like an external keyboard device.

When a KB command such as CAPS LOCK is generated (i.e., by depressing the Caps Lock key on the KB), the command is transmitted from the KB to the CPU. The CPU then sends back a signal to the KB to cause the turn-on of the Caps Lock light and to indicate that the command has been received and the CPU will handle the data received from the KB in accordance with the command.

When a scanner is "wedged" between the KB and the CPU, the scanner information sent to the CPU after the CAPS LOCK command will be subjected to unwanted and undesirable modifications.

In the scanner embodying the invention, the scanner senses the "CAPS LOCK signal" sent out by the CPU and the scanner then modifies the information it sends out to the CPU so that the scanner data will not be subjected to undesirable modifications by the CPU.

The scanner embodying the invention checks whether the CPU is sending information at the same time as the scanner. This is referred to herein as "line contention detection". When the CPU sends information it pulls down the CKL line. When the scanner senses this condition, the scanner stops sending information to the CPU as described below. The scanner sends out information (i.e., a scan code) or data formatted to have a length of 11 bits. The first bit is a start bit, followed by 8 data bits, which are then followed by a parity bit and a stop bit. In the prior art, the scanner was not programmed or designed to check the status of the CPU before each bit. In the scanner according to the invention, the scanner is designed and/or programmed to sense the status of the clock before clocking each bit of data to the CPU. If the scanner senses that the CLK line has been pulled down (i.e., the CPU is not ready to receive data) the scanner stops sending information to the CPU. This is so, except where the scanner has already sent out a parity bit. If the parity bit has been sent out the scanner continues sending the next signal which is the stop bit. If the parity bit has not been sent, the scanner stops sending data immediately and releases the clock and data lines.

In the prior art system of FIG. 1, when decoded data in the scanner's buffer was ready to be transmitted to the CPU, the scanner turned off the TCS (i.e., transmission gates TG1 and TG2). During the TCS off period of time, the communication between the CPU and the KB was totally off, since the scanner was not capable of receiving data from the CPU, the communication between the CPU and the scanner was one way communication. That is, the scanner is only capable of sending data to the CPU. The scanner can not receive data from the CPU because it is not designed to receive this information. One of the problems of this one way communication is lack of error recovery. When the data received by the CPU contains a receiving error, (e.g., a parity error), the CPU requests the KB (the CPU never knows that the scanner has cut off communication between the CPU and the KB) to resend the data. The CPU does this by sending a "RESEND" command to the KB which includes pulling the clock line high and the data line low (request-to-send) (or RTS) and then waiting for the KB to clock out the "RESEND" command from the CPU. The prior art scanner was not capable of detecting the RTS condition and was not capable of clocking out a "RESEND" command from the CPU. Instead the scanner would keep sending the next bits of data which could cause additional communication error between the CPU and the scanner.

In contrast thereto, the scanner 60 of FIG. 6 embodying the invention includes the means (e.g., is programamed) to sense the "RESEND" command (i.e., the RTS command) and to clock out the "RESEND" command from the CPU. After receiving the "RESEND" command, the scanner then resends the full data message previously sent to the CPU.

What is claimed is:

1. In a bar code scanner having means for reading and processing bar code data and including a data line and a clock for either supplying signals to a computer or for receiving signals frorm the computer, means for interconnecting the scanner and a computer comprising:

an interface circuit including: (a) means for direct current connecting the signal lines of the scanner to the signal lines of a computer; and (b) selectively enabled gating means for coupling the signal lines of an external keyboard to the signal lines of the computer and the scanner;

said scanner including means for enabling said gating means whereby signals produced by an external keyboard, if present, are coupled to said signal lines;

keyboard dectect means in said scanner for sensing whether any signals indicative of the presence of an external keyboard are produced on said signal;

means in said scanner for producing signals similar to those produced by a keyboard; and means for supplying to the data and clock lines of a computer the scanner generated signals which are similar to those produced by an external keyboard in response to the scanner sensing that a keyboard is not present in order to establish and maintain communication between the scanner and the computer.

2. In a bar code scanner having means for reading bar code data located external to the scanner and for processing the data and having means for supplying the processed data to an input/output (I/O) port of a computer, where the I/O port is designed for, normally, connection thereto an external keyboard, the improvement comprising:

communication means within the scanner for enabling the scanner either to be connected between an external keyboard and the I/O port or to be directly connected to the I/O port, said communication means including means for sensing whether an external keyboard is connected to the computer and means responsive to sensing the absence of the connection of an external keyboard for producing signals similar to those produced by an external keyboard and for supplying these signals to the computer in order to establish and maintain communication between the scanner and the computer.

3. A bar code scanner comprising:

means for reading bar code data and supplying the bar code data to a signal processor;

means for coupling the signal processor to scanner signal lines;

an interface circuit including: (a) a first section for coupling thereto signal lines from a computer; (b) means for direct current connecting the scanner signal lines to the computer signal lines; (c) a second section for coupling thereto signal lines from an external keyboard; (d) selectively enabled gating means coupled between said second section and said computer signal lines for, when said gating means is enabled, connecting the external keyboard signal lines to the computer and scanner signal lines;

means for enabling said gating means whereby signals produced by an external keyboard, if present, are coupled to said computer and scanner signal lines;

keyboard detect means for sensing whether any signals indicative of the presence of an external keyboard are produced on said computer and scanner signal lines;

means for producing signals similar to those produced by an external keyboard and for supplying these similar signals to the computer and scanner signal in response to the scanner sensing that a keyboard is not present in order to establish and maintain communication between the scanner and the computer.

4. A bar code scanner suitable for use with a computer having an input/output (I/O) port designed for the connection thereto of an external keyboard, comprising:

means for coupling said bar code scanner to said I/O port of said computer and means within said bar code scanner for sensing whether an external keyboard is coupled to said I/O port; and means within said scanner responsive to sensing the absence of an external keyboard for producing signals similar to the signals produced by an external keyboard and for supplying said similar signals to said in order to establish and maintain communication between the scanner and the computer.

5. A bar code scanner as claimed in claim 1, wherein an external keyboard, when connected to a computer, produces a certain signal sequence when power is first applied to the external keyboard; and wherein said bar code scanner includes means for producing signals similar to said certain signal sequence, and in response to sensing the absence of an external keyboard produces said similar signals for supplying them to the computer.

6. A bar code scanner as claimed in claim 5, wherein said scanner senses a "caps lock" command initiated by an external keyboard and in response thereto modifies the data it supplies to the computer for ensuring that the bar code data it supplies to the computer is processed correctly.

7. A bar code scanner as claimed in claim 5 wherein said means within said scanner for sensing whether an external keyboard is coupled to said I/o port includes means for disabling said means for producing signals similar to said certain signal sequence in response to sensing the presence of an external keyboard.

8. A bar code scanner as claimed in claim 1, wherein said means within said bar code scanner for sensing whether an external keyboard is connected to the computer includes a data line for sensing data information and a clock line for sensing clocking information,;

wherein said computer also includes a data line and a clock line; and wherein said bar code scanner includes means for coupling its data and clock lines to those of a computer.

9. A bar code scanner as claimed in claim 1, wherein said means for coupling said scanner to said I/O port of said computer includes an interface circuit for enabling selected signal lines of the scanner to be directly connected to selected signal lines of a computer; and wherein the interface circuit includes gating means for the connection thereto of selected signal lines from an external keyboard to be connected to the selected signal lines of the scanner and of a computer.

10. A bar code scanner as claimed in claim 9, wherein said scanner includes means for initially enabling said gating means, and wherein said means for sensing whether and external keyboard is coupled to said I/O port includes means for sensing whether a certain signal sequence is produced on said signal lines within a predetermined period of time after the application of an operating potential by a computer.

11. A bar code scanner as claimed in claim 1, wherein the scanner includes means for sensing command signals produced by the computer and means for responding to these commands.

12. A bar code scanner as claimed in claim 11, wherein said scanner constantly senses the signal lines interconnecting the scanner and the computer for providing continuous error correction.

13. A bar code scanner as claimed in claim 11, wherein said scanner constantly senses the signal lines interconnecting the scanner and the computer for resending data to the computer in response to a resend request from the computer.

14. A bar code scanner as claimed in claim 1 suitable for use with a computer, wherein said computer is a computer having an internal keyboard.

15. A bar code scanner as claimed in claim 1 wherein the scanner includes means for supplying previously read bar code data to a computer and for monitoring the computers readiness to accept the data.

16. A bar code scanner as claimed in claim 15 wherein the scanner includes means for continuously sensing whether the computer is no longer ready to accept data for terminating transmission of bar code data to the computer.

* * * * *